(12) United States Patent
Champion et al.

(10) Patent No.: US 11,059,752 B2
(45) Date of Patent: Jul. 13, 2021

(54) ZIRCON-BASED SINTERED CONCRETE

(71) Applicant: SAINT-GOBAIN CENTRE DE RECHERCHES ET D'ETUDES EUROPEEN, Courbevoie (FR)

(72) Inventors: Thibault Champion, Villelaure (FR); Michel Bobo, Saint Saturnin les Avignon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 3 days.

(21) Appl. No.: 16/467,729

(22) PCT Filed: Dec. 13, 2017

(86) PCT No.: PCT/EP2017/082686
§ 371 (c)(1),
(2) Date: Jun. 7, 2019

(87) PCT Pub. No.: WO2018/109037
PCT Pub. Date: Jun. 21, 2018

(65) Prior Publication Data
US 2019/0367414 A1 Dec. 5, 2019

(30) Foreign Application Priority Data
Dec. 14, 2016 (FR) .................. 1662456

(51) Int. Cl.
C04B 35/48 (2006.01)
C03B 17/04 (2006.01)
C03B 5/43 (2006.01)
C04B 35/626 (2006.01)
C04B 35/63 (2006.01)
C04B 35/634 (2006.01)
C04B 35/64 (2006.01)

(52) U.S. Cl.
CPC ........... C04B 35/481 (2013.01); C03B 5/43 (2013.01); C03B 17/04 (2013.01); C04B 35/6263 (2013.01); C04B 35/634 (2013.01); C04B 35/6313 (2013.01); C04B 35/64 (2013.01); C04B 2235/3206 (2013.01); C04B 2235/3208 (2013.01); C04B 2235/3217 (2013.01); C04B 2235/3418 (2013.01); C04B 2235/447 (2013.01); C04B 2235/5212 (2013.01); C04B 2235/5427 (2013.01); C04B 2235/72 (2013.01); C04B 2235/77 (2013.01)

(58) Field of Classification Search
CPC ................................... C04B 35/481
See application file for complete search history.

(56) References Cited

U.S. PATENT DOCUMENTS

| | | | |
|---|---|---|---|
| 2011/0107796 A1* | 5/2011 | Citti ............... | C04B 35/482 65/134.1 |
| 2015/0274599 A1 | 10/2015 | Fourcade et al. | |
| 2018/0093924 A1* | 4/2018 | Fourcade ......... | C04B 35/62685 |
| 2019/0276365 A1* | 9/2019 | Fourcade ......... | C04B 35/481 |

FOREIGN PATENT DOCUMENTS

| CN | 105601303 A | 5/2016 |
|---|---|---|
| FR | 2929941 A1 | 10/2009 |

OTHER PUBLICATIONS

Friedrich G. K. Baucke et al: "Electrochemical mechanism of the oxygen bubble formation at the interface between oxidic melts and zirconium silicate refractories", Glastech. Ber. 61 (1998) NR. 5, pp. 109-118.
International Search Report corresponding International application PCT/EP2017/082686 dated Mar. 26, 2018, 3 pages.
Corresponding Japanese Appl. No. 2019-531382, Japanese Office Action dated Aug. 27, 2020.

* cited by examiner

Primary Examiner — Karl E Group
(74) Attorney, Agent, or Firm — Cooper Legal Group, LLC; Ronald M. Kachmarik

(57) ABSTRACT

A sintered concrete having the following mean chemical composition, as mass percentages on the basis of the oxides and for a total of 100%; $ZrO_2$: 55 to 70%, $SiO_2$: 25 to 40%, $P_2O_5$: 0.2 to 9.0%, $Al_2O_3$: 0.5 to 7.0%, CaO: >0.2%, $CaO+MgO+B_2O_3+Fe_2O_3$: 0.2 to 10.0%, $MgO+B_2O_3+Fe_2O_3$: ≤7.5%, $B_2O_3+MgO$: ≤4.5%, $ZrO_2+SiO_2+P_2O_5+Al_2O_3+CaO+MgO+B_2O_3+Fe_2O_3$: ≥95.0%, and containing more than 70% of zircon, as a mass percentage on the basis of the mass of the crystalline phases.

31 Claims, 1 Drawing Sheet

ZIRCON-BASED SINTERED CONCRETE

TECHNICAL FIELD

The invention relates to a zircon-based sintered concrete intended to be in contact with molten glass.

The invention also relates to a process for manufacturing such a concrete and to specific applications of such a concrete.

PRIOR ART

Among sintered products, zircon-based sintered concretes, i.e. concretes including more than 70% by mass of zircon (zirconium silicate: $ZrO_2.SiO_2$, or $ZrSiO_4$), are very suitable for use in contact with borosilicate and opal molten glasses.

The manufacture of sintered concretes must, however, meet implementation constraints. In particular, the rheology of the fresh concrete and its setting time must be adapted so that it can be installed by means of vibration.

Moreover, the formation of bubbles has been observed when these concretes are in contact with molten glass, as described in "*Electrochemical mechanism of the oxygen bubble formation at the interface between oxidic melts and zirconium silicate refractories*", Baucke and Al., Glastech. Ber. 61 (1988) Nr. 5, 109-118. These bubbles are then trapped in the glass, giving rise to prohibitive defects.

There is thus a need for a sintered concrete which induces less bubbling when it is in contact with a molten glass, notably with a molten borosilicate or opal glass, and which, when fresh, can be installed by vibration.

The present invention is directed toward meeting this need.

SUMMARY OF THE INVENTION

More particularly, the invention relates to a sintered concrete having the following mean chemical composition, as mass percentages on the basis of the oxides and for a total of 100%:
  $ZrO_2$: 55 to 70%,
  $SiO_2$: 25 to 40%,
  $P_2O_5$: 0.2 to 9.0%,
  $Al_2O_3$: 0.5 to 7.0%,
  CaO: >0.2%,
  $CaO+MgO+B_2O_3+Fe_2O_3$: 0.2 to 10.0%,
  $MgO+B_2O_3+Fe_2O_3$: ≤7.5%,
  $B_2O_3+MgO$: 4.5%,
  $ZrO_2+SiO_2+P_2O_5+Al_2O_3+CaO+MgO+B_2O_3+Fe_2O_3$: 95.0%,
and containing more than 70% of zircon, as a mass percentage on the basis of the mass of the crystalline phases.

Surprisingly, as shall be seen in detail in the continuation of the description, the inventors have found that the composition and the microstructure of a sintered concrete according to the invention lead to a considerable reduction in bubbling, without substantially modifying the manufacturing conditions.

A sintered concrete according to the invention may also include one or more of the following optional and preferred features:
  the content of $ZrO_2$ is greater than 57%, preferably greater than 58%, preferably greater than 59%, preferably greater than 61%, and/or less than 67%, preferably less than 65%, preferably less than 64.5%;
  the content of $SiO_2$ is greater than 26%, preferably greater than 27%, preferably greater than 28%, preferably greater than 29%, and/or less than 37%, preferably less than 35%, preferably less than 33%, preferably less than 31%;
  the content of $P_2O_5$ is greater than 0.3%, preferably greater than 0.4%, preferably greater than 0.5%, preferably greater than 0.7%, preferably greater than 0.9%, and/or less than 8.5%, preferably less than 8%, preferably less than 7.5%, preferably less than 7.0%, preferably less than 6.5%, preferably less than 5.5%, preferably less than 5.0%, preferably less than 4.0%, preferably less than 3.0%, preferably less than 2.8%;
  the sum of the contents of CaO, MgO, $B_2O_3$ and $Fe_2O_3$, $CaO+MgO+B_2O_3+Fe_2O_3$ is greater than 0.3%, preferably greater than 0.4%, preferably greater than 0.5%, preferably greater than 0.7%, and/or less than 9.5%, preferably less than 9.0%, preferably less than 8.1%, preferably less than 7.4%, preferably less than 6.6%, preferably less than 5.9%, preferably less than 5.1%, preferably less than 4.7%;
  the content of CaO is greater than 0.3%, preferably greater than 0.4%, preferably greater than 0.5% and/or less than 7.9%, preferably less than 7.2%, preferably less than 6.5%, preferably less than 5.8%, preferably less than 5.0%, preferably less than 4.2%, preferably less than 3.7%, preferably less than 3.2%;
  the content of $Al_2O_3$ is greater than 0.8%, preferably greater than 1.0%, preferably greater than 1.5%, and/or less than 6.5%, preferably less than 6.0%, preferably less than 5.5%, preferably less than 5.0%, preferably less than 4.5%, preferably less than 4.0%;
  the sum of the contents of MgO, $B_2O_3$ and $Fe_2O_3$, $MgO+B_2O_3+Fe_2O_3$ is less than 7.0%, preferably less than 6.5%, preferably less than 6.1%, preferably less than 5.7%, preferably less than 5.3%, preferably less than 4.8%, preferably less than 4.4%, preferably less than 3.9%, preferably less than 3.5%, preferably less than 3.0%, preferably less than 2.5%, preferably less than 2.1%;
  the sum of the contents of MgO and $B_2O_3$, $MgO+B_2O_3$ is less than 4%, preferably less than 3.5%, preferably less than 3%, preferably less than 2.4%, preferably less than 1.9%, preferably less than 1.3%;
  the sum of the contents of $ZrO_2$, $SiO_2$, $P_2O_5$, $Al_2O_3$, CaO, MgO, $B_2O_3$ and $Fe_2O_3$, $ZrO_2+SiO_2+P_2O_5+Al_2O_3+CaO+MgO+B_2O_3+Fe_2O_3$ is less than 4.5%, preferably less than 4.0%, preferably less than 3.5%, preferably less than 3.0%, preferably less than 2.5%, preferably less than 2%, preferably less than 1.5%;
  preferably, the content of $Na_2O$ is less than 0.7%, preferably less than 0.5%, preferably less than 0.3%, preferably less than 0.1%;
  the content of zircon, by mass on the basis of the crystalline phases is greater than 75%, preferably greater than 80%, preferably greater than 85%, or even greater than 90%, or even greater than 95%;
  free zirconia is one of the other crystalline phases;
  in one embodiment, the crystalline phases are, for more than 95%, preferably more than 98%, preferably substantially 100% by mass, zircon and free zirconia;
  the apparent density of the sintered concrete is greater than 3.30 g/cm³, preferably greater than 3.40 g/cm³, preferably greater than 3.50 g/cm³, preferably greater than 3.60 g/cm³, and/or less than 3.90 g/cm³, preferably less than 3.80 g/cm³, preferably less than 3.70 g/cm³;

the apparent porosity of the sintered concrete is greater than 10%, preferably greater than 15%, and/or less than 25%, preferably less than 20%;

the sintered concrete is in the form of a block in which all the dimensions are greater than 1 mm, greater than 5 mm, greater than 5 cm and in which all the dimensions are preferably less than 150 cm; it preferably has a mass of greater than 1 kg, greater than 5 kg, greater than 10 kg, or even greater than 100 kg.

In a first preferred embodiment, in particular when the only phosphate present in the feedstock is a magnesium phosphate, preferably $Mg(PO_3)_2$, the sintered concrete has the following mean chemical composition, in mass percentages on the basis of the oxides and for a total of 100%:

$ZrO_2$: 55 to 70%,
$SiO_2$: 25 to 40%,
CaO: 0.2 to 3.0%,
$Al_2O_3$: 0.5 to 7.0%,
MgO: 0.1 to 3.0%,
$P_2O_5$: 0.3 to 9.0%,
other oxides: <5.0%, and contains more than 70% of zircon, as a mass percentage on the basis of the crystalline phases.

Notably for this first preferred embodiment, a sintered concrete may include one or more of the following optional and preferred features:

the content of CaO is less than 2.5%, preferably less than 2.0%, preferably less than 1.5%, preferably less than 1.2%;

the content of MgO is greater than 0.3%, preferably greater than 0.4%, and/or less than 2.8%, preferably less than 2.6%, preferably less than 2.4%, preferably less than 2.2%, preferably less than 2.1%, preferably less than 1.7%, preferably less than 1.3%, preferably less than 0.9%;

the content of "other oxides" is less than 4.5%, preferably less than 4.0%, preferably less than 3.5%, preferably less than 3.0%, preferably less than 2.5%, preferably less than 2%, preferably less than 1.5%;

the content of $Fe_2O_3$ is less than 1%, preferably less than 0.7%, preferably less than 0.5%, preferably less than 0.3%, preferably less than 0.15%;

In a second embodiment, in particular when the only phosphate present in the feedstock is an iron phosphate, preferably $FePO_4$;

the content of $P_2O_5$ is greater than 0.3%, preferably greater than 0.4%, preferably greater than 0.5%, preferably greater than 0.7%, and less than 5.8%, preferably less than 5.1%, preferably less than 4.5%, preferably less than 3.5%, preferably less than 3.0%, preferably less than 2.3%, preferably less than 1.9%, and the content of $Fe_2O_3$ is greater than 0.1%, preferably greater than 0.2%, preferably greater than 0.5%, preferably greater than 0.7%, and less than 6.5%, preferably less than 6.0%, preferably less than 5.5%, preferably less than 5.0%, preferably less than 4.5%, preferably less than 4.0%, preferably less than 3.5%, preferably less than 3.0%, preferably less than 2.5%, preferably less than 2.0%, and the content of MgO is less than 0.5%, preferably less than 0.3%, preferably less than 0.15%, and the content of $B_2O_3$ is less than 0.5%, preferably less than 0.3%, preferably less than 0.15%, and the content of CaO is greater than 0.3%, preferably greater than 0.4%, preferably greater than 0.5%, and less than 3%, preferably less than 2.5%, preferably less than 2.0%, preferably less than 1.5%, preferably less than 1.2%;

the sum of the contents of MgO and $B_2O_3$, MgO+$B_2O_3$ is less than 1%, preferably less than 0.6%, preferably less than 0.3%, preferably less than 0.2%, preferably less than 0.1%, and the sum of the contents of CaO, MgO, $B_2O_3$ and $Fe_2O_3$, CaO+MgO+$B_2O_3$+$Fe_2O_3$ is greater than 0.3%, preferably greater than 0.4%, preferably greater than 0.5%, preferably greater than 0.7%, preferably greater than 1.0%, preferably greater than 1.2%, and less than 10%, preferably less than 9.5%, preferably less than 9.0%, preferably less than 8.1%, preferably less than 7.4%, preferably less than 6.6%, preferably less than 5.9%, preferably less than 5.1%, preferably less than 4.7%, preferably less than 4.2%, preferably less than 3.5%, and the sum of the contents of MgO, $B_2O_3$ and $Fe_2O_3$, MgO+$B_2O_3$+$Fe_2O_3$ is greater than 0.1%, preferably greater than 0.2%, preferably greater than 0.5%, preferably greater than 0.7%, and less than 7.0%, preferably less than 6.5%, preferably less than 6.1%, preferably less than 5.7%, preferably less than 5.3%, preferably less than 4.8%, preferably less than 4.4%, preferably less than 3.9%, preferably less than 3.5%, preferably less than 3.0%, preferably less than 2.3%.

In a third embodiment, in particular when the only phosphate present in the feedstock is boron phosphate $BPO_4$, the content of $P_2O_5$ is greater than 0.25%, preferably greater than 0.4%, preferably greater than 0.7%, preferably greater than 1.0%, and less than 8.3%, preferably less than 7.5%, preferably less than 6.5%, preferably less than 5.5%, preferably less than 4.5%, preferably less than 3.5%, preferably less than 2.7%, and the content of $B_2O_3$ is greater than 0.05%, preferably greater than 0.1%, preferably greater than 0.2%, preferably greater than 0.3%, preferably greater than 0.4%, and less than 4.0%, preferably less than 3.5%, preferably less than 3.0%, preferably less than 2.5%, preferably less than 2.0%, preferably less than 1.6%, preferably less than 1.3%, and the content of MgO is less than 0.5%, preferably less than 0.3%, preferably less than 0.15%, and the content of $Fe_2O_3$ is less than 0.5%, preferably less than 0.3%, preferably less than 0.15%, and the content of CaO is greater than 0.3%, preferably greater than 0.4%, preferably greater than 0.5%, and less than 3%, preferably less than 2.5%, preferably less than 2.0%, preferably less than 1.5%, preferably less than 1.2%, and the sum of the contents of CaO, MgO, $B_2O_3$ and $Fe_2O_3$, CaO+MgO+$B_2O_3$+$Fe_2O_3$ is greater than 0.3%, preferably greater than 0.4%, preferably greater than 0.5%, preferably greater than 0.7%, preferably greater than 0.9%, and less than 8.0%, preferably less than 7.4%, preferably less than 6.6%, preferably less than 5.9%, preferably less than 5.1%, preferably less than 4.7%, preferably less than 4.2%, preferably less than 3.5%, preferably less than 2.8%, and the sum of the contents of MgO, $B_2O_3$ and $Fe_2O_3$, MgO+$B_2O_3$+$Fe_2O_3$ is greater than 0.05%, preferably greater than 0.1%, preferably greater than 0.2%, preferably greater than 0.3%, preferably greater than 0.4%, and less than 5.0%, preferably less than 4.8%, preferably less than 4.4%, preferably less than 3.9%, preferably less than 3.5%, preferably less than 3.0%, preferably less than 2.3%, preferably less than 1.6%, and the sum of the contents of MgO and $B_2O_3$, $MgO+B_2O_3$ is greater than 0.05%, preferably greater than 0.1%, preferably greater than 0.2%, preferably greater than 0.3%, preferably greater than 0.4% and less than 4.5%, preferably less than 3.9%, preferably less than 3.5%, preferably less than 3.0%, preferably less than 2.3%, preferably less than 1.5%.

In a fourth embodiment, in particular when the only phosphate present in the feedstock is a calcium phosphate, preferably $Ca_2P_2O_7$, the content of $P_2O_5$ is greater than 0.25%, preferably greater than 0.4%, preferably greater than 0.7%, preferably greater than 0.9% and less than 7.0%, preferably less than 6.5%, preferably less than 6.0%, preferably less than 5.5%, preferably less than 5.0%, preferably less than 4.5%, preferably less than 4.0%, preferably less than 3.5%, preferably less than 3.0%, preferably less than 2.5%, and the content of CaO is greater than 0.3%, preferably greater than 0.5%, preferably greater than 0.8%, preferably greater than 1.1%, and less than 8.4%, preferably less than 7.8%, preferably less than 7.0%, preferably less than 6.5%, preferably less than 6.0%, preferably less than 5.5%, preferably less than 5.0%, preferably less than 4.5%, preferably less than 4.0%, preferably less than 3.5%, preferably less than 2.9%, and the content of $B_2O_3$ is less than 0.5%, preferably less than 0.3%, preferably less than 0.15%, and the content of MgO is less than 0.5%, preferably less than 0.3%, preferably less than 0.15%, and the content of $Fe_2O_3$ is less than 0.5%, preferably less than 0.3%, preferably less than 0.15%, and the sum of the contents of CaO, MgO, $B_2O_3$ and $Fe_2O_3$, $CaO+MgO+B_2O_3+Fe_2O_3$ is greater than 0.3%, preferably greater than 0.4%, preferably greater than 0.5%, preferably greater than 0.7%, preferably greater than 0.9%, preferably greater than 1.1%, and less than 9.5%, preferably less than 9.0%, preferably less than 8.5%, preferably less than 8.0%, preferably less than 7.5%, preferably less than 7.0%, preferably less than 6.5%, preferably less than 6.0%, preferably less than 5.5%, preferably less than 5.0%, preferably less than 4.5%, preferably less than 4.0%, preferably less than 3.4%, and the sum of the contents of MgO, $B_2O_3$ and $Fe_2O_3$, $MgO+B_2O_3+Fe_2O_3$ is less than 1.5%, preferably less than 1.0%, preferably less than 0.5%, preferably less than 0.3%, and the sum of the contents of MgO and $B_2O_3$, $MgO+B_2O_3$ is less than 1.0%, preferably less than 0.5%, preferably less than 0.3%.

In a fifth embodiment, in particular when the only phosphate present in the feedstock is an aluminum phosphate, preferably $AlPO_4$ the content of $P_2O_5$ is greater than 0.25%, preferably greater than 0.35%, preferably greater than 0.6%, preferably greater than 0.9%, and less than 2.4%, and the content of $Al_2O_3$ is greater than 0.8%, preferably greater than 1.0%, preferably greater than 1.5%, preferably greater than 2.0%, preferably greater than 2.5%, and less than 6.5%, preferably less than 6.0%, preferably less than 5.5%, and the content of $B_2O_3$ is less than 0.5%, preferably less than 0.3%, preferably less than 0.15%, and the content of MgO is less than 0.5%, preferably less than 0.3%, preferably less than 0.15%, and the content of $Fe_2O_3$ is less than 0.5%, preferably less than 0.3%, preferably less than 0.15%, and the content of CaO is greater than 0.3%, preferably greater than 0.4%, preferably greater than 0.5%, and less than 3%, preferably less than 2.5%, preferably less than 2.0%, preferably less than 1.5%, preferably less than 1.2%, and the sum of the contents of CaO, MgO, $B_2O_3$ and $Fe_2O_3$, $CaO+MgO+B_2O_3+Fe_2O_3$ is greater than 0.2%, preferably greater than 0.3%, preferably greater than 0.4%, preferably greater than 0.5% and less than 4.5%, preferably less than 4.0%, preferably less than 3.5%, preferably less than 3.0%, preferably less than 2.5%, preferably less than 2.0%, preferably less than 1.7%, and the sum of the contents of MgO, $B_2O_3$ and $Fe_2O_3$, $MgO+B_2O_3+Fe_2O_3$ is less than 1.5%, preferably less than 1.0%, preferably less than 0.5%, preferably less than 0.3%, and the sum of the contents of MgO and $B_2O_3$, $MgO+B_2O_3$ is less than 1.0%, preferably less than 0.5%, preferably less than 0.3%.

The invention also relates to a process for manufacturing a sintered concrete according to the invention, comprising the following successive steps:

a) mixing particular starting materials to form a feedstock,
b) activating said feedstock so as to obtain a fresh concrete,
c) forming said fresh concrete,
d) hardening said fresh concrete so as to obtain a hardened concrete,
e) sintering said hardened concrete so as to obtain said sintered concrete, the composition of the feedstock being adapted so that the sintered concrete obtained after step e) is in accordance with the invention.

The adaptation of the feedstock does not pose any difficulties to a person skilled in the art.

Preferably, the feedstock includes between 1.0% and 6.0% by weight of a hydraulic binder, preferably of a cement, and more than 0.25% of a phosphate chosen from magnesium phosphates, iron phosphates, boron phosphates, calcium phosphates, aluminum phosphates and mixtures thereof, said phosphate providing more than 50% of the phosphorus of the feedstock.

Surprisingly, the inventors have found that this combination of hydraulic binder and of said phosphate, preferably magnesium phosphate, substantially improves the possibilities for forming the fresh concrete, notably by vibration.

Preferably, the process according to the invention also has one or more of the following optional features:

in the feedstock, the mass amount of zircon particles, i.e. of particles including more than 90%, preferably more than 95% by mass of zircon on the basis of the mass of the crystalline phases of said particles is greater than 70%, preferably greater than 73%, preferably greater than 75%, preferably greater than 78%, preferably greater than 80%, and/or less than or equal to 95%, preferably less than or equal to 90% of the mass of the feedstock;

in the feedstock, the mass amount of free zirconia particles, i.e. of particles including more than 90%, preferably more than 95% by mass of zirconia not associated with silica in a zircon phase, on the basis of the mass of the crystalline phases of said particles is greater than 1.0%, preferably greater than 3.0%, preferably greater than 5.0%, preferably greater than 6.0%, and/or less than 20.0%, preferably less than 15.0%, preferably less than 12.0%;

the amount of hydraulic binder in the feedstock is greater than 1.5%, preferably greater than 2.0%, and/or less than 5.5%, preferably less than 5.0%, preferably less than 4.0% of the mass of the feedstock;

the hydraulic binder is a cement, preferably an aluminous cement, preferably a calcium aluminate cement;

the alumina content of the hydraulic binder is preferably between 50% and 85%;

the feedstock is constituted, for more than 90%, preferably for more than 92%, preferably for more than 95%, preferably for more than 97%, preferably for more than 98% of its mass, of zircon particles, of hydraulic binder particles, of particles of said phosphate chosen from magnesium phosphates, iron phosphates, boron phosphates, calcium phosphates, aluminum phosphates and mixtures thereof, preferably of magnesium phosphate, of fumed silica particles, of zirconia particles and of particles of forming additive;

the feedstock includes magnesium phosphate $Mg(PO_3)_2.nH_2O$ with $n \geq 0$ and/or iron phosphate $FePO_4.nH_2O$ with $n \geq 0$ and/or boron phosphate $BPO_4.nH_2O$ with $n \geq 0$ and/or calcium phosphate $Ca_2P_2O_7.nH_2O$ with $n \geq 0$ and/or aluminum phosphate $AlPO_4.nH_2O$ with $n \geq 0$. Preferably, the feedstock includes magnesium phosphate $Mg(PO_3)_2.nH_2O$ with $n \geq 0$;

in one embodiment, the mass amount of the phosphate chosen from magnesium phosphates, iron phosphates, boron phosphates, calcium phosphates, aluminum phosphates and mixtures thereof, in particular of magnesium phosphate, preferably $Mg(H_2PO_4)_2$, $MgHPO_4$, $Mg_3(PO_4)_2$, $Mg(PO_3)_2$, $Mg_2P_2O_7$ and mixtures thereof, said compounds possibly incorporating water molecules, for instance $Mg_3(PO_4)_2.nH_2O$ with $n \geq 0$ in the feedstock is greater than 0.3%, preferably greater than 0.5%, preferably greater than 1.0%, or even greater than 1.5%, and/or less than 14.0%, preferably less than 13.0%, preferably less than 12.0%, preferably less than 11.0%, preferably less than 10.0%, preferably less than 9.0%, preferably less than 8.0%, preferably less than 7.0%, preferably less than 6.0%, preferably less than 5.0%, preferably less than 4.0%.

Advantageously, the creep behavior at high temperatures is thereby improved;

in a preferred embodiment, the only phosphate present in the feedstock is $Mg(PO_3)_2.nH_2O$ with $n \geq 0$, and the mass amount of $Mg(PO_3)_2.nH_2O$ in the feedstock is greater than 0.3%, preferably greater than 0.5%, preferably greater than 1.0%, or even greater than 1.5%, and/or less than 14.0%, preferably less than 13.0%, preferably less than 12.0%, preferably less than 11.0%, preferably less than 10.0%, preferably less than 9.0%, preferably less than 8.0%, preferably less than 7.0%, preferably less than 6.0%, preferably less than 5.0%, preferably less than 4.0%;

in one embodiment, the mass amount of iron phosphate in the feedstock is greater than 0.3%, preferably greater than 0.5%, preferably greater than 1.0%, or even greater than 1.5%, and/or less than 14.0%, preferably less than 13.0%, preferably less than 12.0%, preferably less than 11.0%, preferably less than 10.0%, preferably less than 9.0%, preferably less than 8.0%, preferably less than 7.0%, preferably less than 6.0%, preferably less than 5.0%, preferably less than 4.0%;

in one embodiment, the only phosphate present in the feedstock is an iron phosphate, preferably $FePO_4.nH_2O$ with $n \geq 0$, and the mass amount of iron phosphate in the feedstock is greater than 0.3%, preferably greater than 0.5%, preferably greater than 1.0%, or even greater than 1.5%, and/or less than 14.0%, preferably less than 13.0%, preferably less than 12.0%, preferably less than 11.0%, preferably less than 10.0%, preferably less than 9.0%, preferably less than 8.0%, preferably less than 7.0%, preferably less than 6.0%, preferably less than 5.0%, preferably less than 4.0%;

in one embodiment, the mass amount of boron phosphate in the feedstock is greater than 0.3%, preferably greater than 0.5%, preferably greater than 1.0%, or even greater than 1.5%, and/or less than 14.0%, preferably less than 13.0%, preferably less than 12.0%, preferably less than 11.0%, preferably less than 10.0%, preferably less than 9.0%, preferably less than 8.0%, preferably less than 7.0%, preferably less than 6.0%, preferably less than 5.0%, preferably less than 4.0%;

in one embodiment, the only phosphate present in the feedstock is a boron phosphate, preferably $BPO_4.nH_2O$ with $n \geq 0$, and the mass amount of boron phosphate in the feedstock is greater than 0.3%, preferably greater than 0.5%, preferably greater than 1.0%, or even greater than 1.5%, and/or less than 14.0%, preferably less than 13.0%, preferably less than 12.0%, preferably less than 11.0%, preferably less than 10.0%, preferably less than 9.0%, preferably less than 8.0%, preferably less than 7.0%, preferably less than 6.0%, preferably less than 5.0%, preferably less than 4.0%;

in one embodiment, the mass amount of calcium phosphate in the feedstock is greater than 0.3%, preferably greater than 0.5%, preferably greater than 1.0%, or even greater than 1.5%, and/or less than 14.0%, preferably less than 13.0%, preferably less than 12.0%, preferably less than 11.0%, preferably less than 10.0%, preferably less than 9.0%, preferably less than 8.0%, preferably less than 7.0%, preferably less than 6.0%, preferably less than 5.0%, preferably less than 4.0%;

in one embodiment, the only phosphate present in the feedstock is a calcium phosphate, preferably $Ca_2P_2O_7.nH_2O$ with $n \geq 0$, and the mass amount of calcium phosphate in the feedstock is greater than 0.3%, preferably greater than 0.5%, preferably greater than 1.0%, or even greater than 1.5%, and/or less than 14.0%, preferably less than 13.0%, preferably less than 12.0%, preferably less than 11.0%, preferably less than 10.0%, preferably less than 9.0%, preferably less than 8.0%, preferably less than 7.0%, preferably less than 6.0%, preferably less than 5.0%, preferably less than 4.0%;

in one embodiment, the mass amount of aluminum phosphate in the feedstock is greater than 0.3%, preferably greater than 0.5%, preferably greater than 1.0%, or even greater than 1.5%, and/or less than 4.0%;

in one embodiment, the only phosphate present in the feedstock is an aluminum phosphate, preferably $AlPO_4.nH_2O$ with $n \geq 0$ and the mass amount of aluminum phosphate in the feedstock is greater than 0.3%, preferably greater than 0.5%, preferably greater than 1.0%, or even greater than 1.5% and/or less than 4.0%;

in a preferred embodiment, the 99.5 percentile, $D_{99.5}$ of the feedstock is less than 15 mm, preferably less than 10 mm, preferably less than 8 mm, preferably less than 5 mm, or even less than 4 mm, or even less than 3 mm and preferably greater than 0.4 mm, preferably greater than 1 mm, or even greater than 2 mm.

Finally, the invention relates to a glass production unit, in particular a glassmaking kiln, including a component including or constituted of a sintered concrete according to the invention, preferably manufactured according to the process according to the invention.

In particular, and without this limiting the invention, said component may be:
- a plate block,
- a floor slab,
- a superstructure component,
- a channel block of a feed channel,
- a burner unit,
- a consumable, for example a liner, a plunger, a stirrer, a rotor, a flow washer, a fore hearth tank,
- a mandrel used in the manufacture of glass tubes according to the Danner process,
- an electrode holder block.

Definitions

The term "feedstock" or "unfashioned concrete" refers to a particulate mixture including a hydraulic binder which is capable of setting to a solid after activation.

Activation is a process of setting to a solid. The activated state conventionally results from the wetting of an unfashioned concrete with water or another liquid. During this process, a wet unfashioned concrete is known as "fresh concrete".

The solid mass obtained by the setting to a solid of a fresh concrete is known as "hardened concrete". A hardened concrete is conventionally constituted of an assembly of coarse grains with a size of between 150 μm and 25 mm bound by a matrix, said matrix providing a continuous structure between the coarse grains, obtained, after activation, during the setting to a solid of the feedstock. After sintering, the hardened concrete is known as "sintered concrete".

The term "hydraulic binder" refers to a binder which, during activation, generates hydraulic setting and hardening, generally at ambient temperature. A cement is a hydraulic binder. An aluminous cement is an example of cement. Calcium aluminate cement is an example of aluminous cement.

The "size" of the particles is conventionally evaluated via a particle size distribution characterization performed with a laser particle size analyzer for the fraction of the particles passing through a square-lattice screen with an aperture equal to 150 μm and, for the retainings on said screen, by screening using square-lattice screens. The laser particle size analyzer may be, for example, a Partica LA-950 from the company Horiba.

The 50 ($D_{50}$) and 99.5 ($D_{99.5}$) percentiles or "centiles" are the particle sizes of a powder corresponding to the mass percentages of 50% and of 99.5%, respectively, on the cumulative particle size distribution curve of the particle sizes of the powder, the particle sizes being classified in increasing order. For example, 99.5% by mass of the particles of the powder have a size less than $D_{99.5}$ and 50% by mass of the particles have a size greater than or equal to $D_{50}$. The percentiles may be determined by means of a particle size distribution performed using a laser particle size analyzer and/or by screening.

The "median size" refers to the 50 percentile ($D_{50}$).
The "maximum size" refers to the 99.5 percentile ($D_{99.5}$).

The term "phosphate of the element A" refers to an electrically neutral compound of formula $A_aP_pH_hO_o(OH)_y(H_2O)_n$, a, p and o being integers >0, h, y and n being integers 0, and $3 \leq o/p \leq 4$. $FePO_4$ is an example of iron phosphate, $BPO_4$ is an example of iron phosphate, $Ca_2P_2O_7$ is an example of calcium phosphate, $Mg(PO_3)_2$ is an example of magnesium phosphate and $AlPO_4$ is an example of aluminum phosphate.

When reference is made to $ZrO_2$, what should be understood is $ZrO_2$ and traces of $HfO_2$. The traces of $HfO_2$ are typically less than 2% of the mass of the assembly $ZrO_2+HfO_2$. These traces are always naturally present in sources of free zirconia or of zircon. Hafnium oxide is therefore not considered as an "other oxide".

All the percentages of the present description are mass percentages, unless otherwise mentioned. The percentages relating to the composition are on the basis of the oxides, unless otherwise indicated.

The sum of the contents of the constituents of a sintered concrete according to the invention is 100%. The contents can therefore only take values within the claimed ranges as long as this restriction is respected. For example, all the upper or lower limits of the ranges of the constituents of a sintered concrete according to the invention cannot be reached simultaneously.

The verbs "to include", "to have" or "to comprise" should be interpreted in a broad, nonlimiting sense, unless otherwise indicated. For example, if "the feedstock includes magnesium phosphate $Mg(PO_3)_2$", this does not exclude the presence of another magnesium phosphate.

BRIEF DESCRIPTION OF THE FIGURES

Other features and advantages of the invention will emerge more clearly on reading the detailed description which follows and on examining the detailed drawing in which.

Figure 1:
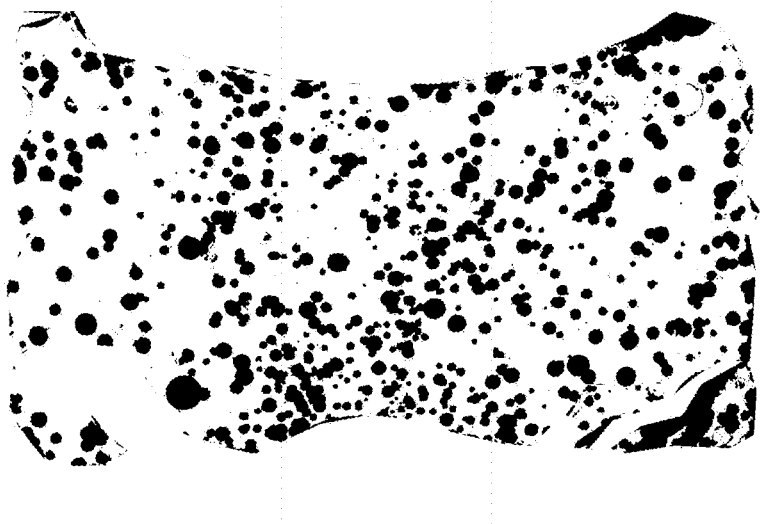
FIGS. 1 and 2 are photographs of glass surfaces observed for example 1, outside the invention, and example 3, according to the invention, respectively.

The photographs were taken at the same magnification.

DETAILED DESCRIPTION

Steps similar to those of a conventional process for manufacturing a sintered concrete intended for applications in glass melting furnaces may be performed.

In particular, a concrete according to the invention may be manufactured according to steps a) to c) described above.

In step a), a dry particulate feedstock is prepared as a function of the desired composition and porosity.

Composition

The manner of determining the proportions of the constituents of the feedstock is entirely known to those skilled in the art. In particular, a person skilled in the art knows that the zirconium, silicon, calcium, aluminum, magnesium, iron, boron and phosphorus present in the feedstock are found in the sintered concrete. He also knows how to determine which constituents will be transformed to constitute the matrix.

The feedstock preferably includes more than 0.25%, preferably more than 0.5%, preferably more than 1% of a phosphate chosen from magnesium phosphates, iron phosphates, boron phosphates, calcium phosphates, aluminum phosphates and mixtures thereof, preferably a magnesium phosphate, preferably $Mg(H_2PO_4)_2$, $MgHPO_4$, $Mg_3(PO_4)_2$, $Mg(PO_3)_2$, $Mg_2P_2O_7$ and mixtures thereof, said compounds possibly incorporating water molecules, preferably Mg(PO$_3$)$_2$, said phosphate providing more than 50%, preferably more than 60%, preferably more than 70%, preferably more than 80%, of the phosphorus of the feedstock. Surprisingly, and as demonstrated by the examples below, the inventors have discovered that the combination of magnesium and/or iron and/or aluminum and/or boron and/or calcium with phosphorus in the form of a magnesium phosphate and/or of an iron phosphate and/or of an aluminum phosphate and/or of a boron phosphate and/or of a calcium phosphate substantially improves the possibilities for forming the fresh concrete, notably by vibration, while at the same time limiting the bubbling of the sintered concrete when it is in contact with molten glass.

Preferably, the feedstock is constituted of zircon particles, of hydraulic binder, preferably of a cement, of magnesium phosphate and/or of iron phosphate and/or of aluminum phosphate and/or of boron phosphate and/or of calcium phosphate, of fumed silica, of zirconia and of a forming additive.

Preferably, more than 70%, more than 80% of the zirconium, expressed in the form of zirconia ZrO$_2$, as a mass percentage, is provided in the form of zircon, the remainder being provided in the form of free zirconia.

Preferably, the feedstock includes not more than 5% of free silica, i.e. silica which is not associated, for instance in zircon. Preferably, the free silica is fumed silica. Preferably, the fumed silica contains more than 93% of silica (SiO$_2$), the fumed silica powder having a median size of between 0.1 and 0.8 μm, preferably between 0.2 and 0.7 μm.

The hydraulic binder is a cement, preferably an aluminous cement, preferably a calcium aluminate cement.

Preferably, more than 60%, more than 65%, more than 70% of the aluminum, expressed in the form of alumina Al$_2$O$_3$, as a mass percentage, is provided in the form of a hydraulic binder, preferably in the form of an aluminous cement, preferably in the form of a calcium aluminate cement.

In a preferred embodiment, the oxides other than ZrO$_2$, SiO$_2$, CaO, Al$_2$O$_3$, MgO, Fe$_2$O$_3$, B$_2$O$_3$ and P$_2$O$_5$, preferably the oxides other than ZrO$_2$, SiO$_2$, CaO, Al$_2$O$_3$, MgO and P$_2$O$_5$ are impurities, i.e. inevitable constituents, necessarily introduced with the starting materials. By way of example, mention may be made of Na$_2$O.

Preferably, the content of Na$_2$O is less than 0.7%, preferably less than 0.5%, preferably less than 0.3%, preferably less than 0.1%.

The feedstock preferably contains a forming additive, preferably temporarily (i.e. removed during the sintering), preferably in a mass amount of less than 3.0%, preferably less than 2.0%, preferably less than 1.0%, preferably less than 0.5% and preferably greater than 0.05%, preferably greater than 0.1%.

Preferably, the forming additive is chosen from
plasticizers, such as polyethylene glycol (PEG) or polyvinyl alcohol (PVA), organic temporary binders such as resins, lignosulfonates, dextrin and alginates, deflocculants, such as alkali metal polyphosphates, alkali metal polyacrylates, polycarboxylates, and
mixtures of these products.

In one embodiment, the feedstock includes fibers, preferably organic fibers, preferably of vinyl or polypropylene type, preferably in a mass amount of between 0.01% and 0.1%, preferably in a mass amount of between 0.01% and 0.03%. Preferably, the mean (arithmetic mean) length of these fibers is greater than 6 mm, preferably between 18 and 24 mm. These fibers advantageously facilitate the removal of water during drying.

In another embodiment, the feedstock does not include any fibers.

Particle Size Distribution

Preferably, the maximum size of the feedstock particles is less than or equal to 15 mm, preferably less than or equal to 10 mm, preferably less than or equal to 8 mm, preferably less than or equal to 5 mm, or even less than 4 mm, or even less than 3 mm and preferably greater than 0.4 mm, preferably greater than 1 mm, or even greater than 2 mm.

Preferably, more than 30%, more than 35%, or even more than 45% of the zircon particles are aggregate particles, i.e. particles with a size of between 150 μm and 15 mm.

Preferably, more than 45%, more than 50% and less than 70%, less than 65% of the zircon particles are fine particles, i.e. particles with a size of less than 150 μm.

Preferably, more than 90%, more than 95%, or even 100% of the particles including more than 15% by mass of CaO and/or of the particles including more than 40% by mass of Al$_2$O$_3$ and/or of the particles including more than 15% by mass of MgO and/or of the particles including more than 50% by mass of P$_2$O$_5$ and/or of the particles including more than 40% by mass of Fe$_2$O$_3$ and/or of the particles including more than 30% by mass of B$_2$O$_3$ are fine particles, i.e. particles with a size of less than 150 μm.

Preferably, the zirconia particle powder (providing free zirconia) has a median size of less than 10 μm, preferably less than 8 μm, preferably less than 5 μm, and/or greater than 1 μm, preferably greater than 2 μm.

The Andréasen or Fuller-Bolomey compaction models may be used to adapt the particle size distribution of the feedstock to the desired porosity. Compaction models are notably described in the publication entitled "*Traité de céramiques et matériaux minéraux* [*Treatise on ceramics and mineral materials*]"; C. A. Jouenne, Editions Septima. Paris (1984), pages 403 to 405.

In step b), preferably after having sufficiently dry-blended to obtain a homogeneous mix, water is conventionally added to the feedstock. Preferably, at least 3% and less than 8%, preferably less than 7% of water, as mass percentages relative to the mineral mass of the feedstock, are added, besides the water. The amount of water depends on the technique used in step c). For example, for a step c) performed by vibration casting, addition of an amount of water of between 3% and 6%, as mass percentages on the basis of the feedstock, is preferred.

The water is preferably added gradually to the mixer while it is running, until a substantially homogeneous wet mix is obtained. The addition of water brings about activation of the feedstock, i.e. it engages its process of setting to a solid.

In step c), the fresh concrete obtained in step b) may be poured into a mold, in order to be formed, so as to form a raw component.

Preferably, the mold is conformed so that the sintered concrete obtained is in the form of a block with a mass of greater than 5 kg, preferably 10 kg. Such blocks are well suited to the intended applications.

The forming may result from casting, vibro-casting, vibro-compacting, pressing or a combination of these techniques, preferably from casting, vibro-casting or a combination of these techniques.

In step d), the fresh concrete sets to a solid so as to obtain a hardened concrete. The hardened concrete may undergo a drying step, so as to remove part of the water which was used for the forming. Such a step is entirely known to those skilled in the art.

In step e), the hardened concrete is sintered at a temperature preferably between 900° C. and 1600° C., preferably between 1300° C. and 1600° C., preferably in air, preferably at atmospheric pressure. The sintering time is adapted as a function of the dimensions of the hardened concrete to be sintered. The duration of the sintering stage is generally between 1 and 20 hours, preferably between 5 and 10 hours. In applications in which, in its service position, the hardened concrete may be subjected to heating conditions liable to sinter it, the hardened concrete is preferably placed in position without having been sintered, and is then sintered in situ.

On conclusion of step e), a sintered concrete according to the invention is obtained. Preferably, the oxides represent more than 98.5%, more than 99% or even substantially 100% of the mass of a sintered concrete according to the invention.

Examples

The nonlimiting examples that follow are given for the purposes of illustrating the invention. In these examples, the following starting materials used were chosen, the percentages given being mass percentages:

a zircon aggregate having the following chemical analysis, as mass percentages: $ZrO_2$: 66%, $SiO_2$: 33%, $Al_2O_3$: 0.3%, $P_2O_5$: 0.3%, $Fe_2O_3$: <0.1%, $TiO_2$: <0.1%, less than 0.2% of other compounds, a size of between 0.5 and 2 mm and a median size ($D_{50}$) equal to 0.9 mm, a zircon aggregate having the following mean chemical analysis, as mass percentages: $ZrO_2$: 66%, $SiO_2$: 33%, $Al_2O_3$: 0.3%, $P_2O_5$: 0.3%, $Fe_2O_3$:<0.1%, $TiO_2$: <0.1%, less than 0.2% of other compounds, a size of between 0 and 0.5 mm, and a median size ($D_{50}$) equal to 0.35 mm, a zircon sand having the following mean chemical analysis, as mass percentages: $ZrO_2$: 66.8%, $SiO_2$: 32.9%, $Al_2O_3$: 0.52%, $P_2O_5$: 0.08%, $Fe_2O_3$: <0.1%, $TiO_2$<0.1%, less than 0.2% of other compounds and a median size ($D_{50}$) equal to 170 μm, a zircon flour having the following mean chemical analysis, as mass percentages: $ZrO_2$: 66.4%, $SiO_2$: 32.7%, $Al_2O_3$: 0.16%, $P_2O_5$: 0.12%, $Fe_2O_3$: <0.1%, $TiO_2$: 0.10%, and less than 0.2% of other compounds, and a median size ($D_{50}$) equal to 10.9 μm, a micronized zircon powder having the following mean chemical analysis, as mass percentages: $ZrO_2$: 63.6%, $SiO_2$: 34.1%, $Al_2O_3$: 0.94%, $P_2O_5$: 0.13%, $Fe_2O_3$: 0.06%, $TiO_2$: 0.10%, and less than 0.2% of other compounds, and a median size ($D_{50}$) equal to 1.4 μm, zirconia, sold by the company Société Européenne des Produits Réfractaires under the name CC10, the median size of which is equal to 3.5 μm, and having a mass content of zirconia of greater than 98.5%, fumed silica, the median size of which is equal to 0.5 μm, and having a silica content of greater than 93.5%, a magnesium phosphate $Mg(PO_3)_2$ powder, having a median size equal to 14 μm, an iron phosphate $FePO_4.nH_2O$ powder, having a median size equal to 8 μm, and having a loss on ignition at 1000° C. equal to 20%, a boron phosphate $BPO_4$ powder, having a median size equal to 8 μm, a calcium phosphate $Ca_2P_2O_7$ powder, having a median size equal to 8 μm, a calcium aluminate cement CA25R sold by the company Almatis, having a median size ($D_{50}$) equal to 9 μm, a sodium polyphosphate powder, a modified polycarboxylate ester.

Sintered concrete blocks were manufactured according to a process in accordance with the invention.

In step a), the starting materials were measured out and mixed so as to form a feedstock. In step b), the feedstock was placed in a mixer and an amount of water as described in table 1 was added. After mixing for a time of 10 minutes, the fresh concrete is obtained.

In step c), the fresh concrete is vibration-cast (50 Hz, 0.3 mm of double amplitude) in a wooden mold.

In step d), after setting, a hardened concrete is obtained, and is removed from the mold.

In step e), the hardened concrete is sintered in the following thermal cycle:

raising from ambient temperature to 1560° C. at a rate of 100° C./h, maintenance at 1560° C. for 6 hours, lowering the temperature at a rate equal to 100° C./h down to 500° C., followed by free lowering to ambient temperature.

Table 1 below summarizes, for each example, the composition of the feedstock, the amount of water used in step b) and the possibility of laying the concrete by vibration.

TABLE 1

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Zircon aggregate 0.5-2 mm (%) | 28.85 | 29.15 | 29.05 | 28.65 | 28.7 | 27.4 | 26.9 | 26.1 | 28.3 | 28.3 | 28.3 |
| Zircon aggregate 0-0.5 mm (%) | 10 | 9.8 | 9.7 | 9.6 | 9.95 | 9.5 | 9.3 | 9.05 | 9.8 | 9.8 | 9.8 |
| Zircon sand (%) | 24 | 23.3 | 23.3 | 23.1 | 23.9 | 22.8 | 22.35 | 21.7 | 23.5 | 23.5 | 23.5 |
| Zircon flour (%) | 14 | 13.7 | 13.6 | 13.5 | 13.9 | 13.3 | 13 | 12.65 | 13.7 | 13.7 | 13.7 |
| Micronized zircon (%) | 7 | 6.8 | 6.8 | 6.7 | 7 | 6.65 | 6.5 | 6.3 | 6.85 | 6.85 | 6.85 |
| Zirconia (%) | 10 | 9.8 | 9.7 | 9.6 | 9.9 | 9.5 | 9.3 | 9.05 | 9.8 | 9.8 | 9.8 |
| Fumed silica (%) | 3 | 2.9 | 2.9 | 2.9 | 3 | 3 | 3 | 3 | 3 | 3 | 3 |
| Cement CA25R (%) | 3 | 2.9 | 2.9 | 2.9 | 3 | 3 | 3 | 3 | 3 | 3 | 3 |
| $Mg(PO_3)_2$ (%) | — | — | 1.9 | 2.9 | 0.5 | 4.7 | 6.5 | 9 | — | — | — |
| $FePO_4·nH_2O$ (%) | — | — | — | — | — | — | — | — | 1.9 | — | — |
| $BPO_4$ (%) | — | — | — | — | — | — | — | — | — | 1.9 | — |
| $Ca_2P_2O_7$ (%) | — | — | — | — | — | — | — | — | — | — | 1.9 |
| Sodium polyphosphate (%) | — | 1.5 | — | — | — | — | — | — | — | — | — |

TABLE 1-continued

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Modified polycarboxylate ether (%) | 0.15 | 0.15 | 0.15 | 0.15 | 0.15 | 0.15 | 0.15 | 0.15 | 0.15 | 0.15 | 0.15 |
| Water (%) | 3.7 | 4.1 | 4.1 | 4.3 | 4.3 | 4.3 | 4.3 | 4.3 | 4.3 | 4.3 | 4.3 |
| Possibility of laying the fresh concrete by vibration | yes | no | yes | yes | yes | yes | yes | yes | yes | yes | yes |

Table 1 shows that the presence of $Mg(PO_3)_2$ in amounts equal to 1.9% and 2.9% modifies little the behavior of the fresh concrete, which remains vibration-castable. On the other hand, the addition of sodium polyphosphate does not allow vibration casting.

This is likewise the case for the presence of $Mg(PO_3)_2$ in amounts equal to 0.5%, 4.7%, 6.5% and 9%, and also for $FePO_4$ in an amount equal to 1.9%, $BPO_4$ in an amount equal to 1.9%, and $Ca_2P_2O_7$ in an amount equal to 1.9%.

The apparent density and the apparent porosity of the sintered concretes of examples 1 and 3 to 11 were measured according to the standard ISO5017.

The chemical analyses were performed by X-ray fluorescence.

The bubbling behavior on contact with molten glass of the sintered concretes of examples 1 and 3 to 11 were evaluated via the following method:

Crucibles with an outside diameter equal to 50 mm, a total height equal to 40 mm, a concentric hole with an outside diameter having a diameter equal to 30 mm and a base with a thickness equal to 10 mm are machined in the sintered concretes of the test examples.

Each crucible is filled with 30 g of a clear borosilicate glass powder whose median size is equal to 1 mm, whose maximum size is equal to 2 mm, and having the following chemical analysis by mass: $SiO_2$: 73%, $B_2O_3$: 10%, $Al_2O_3$: 5%, $Na_2O+K_2O$: 7.5%, other oxides: 4.5%. The crucible and the glass as a whole is then placed in an electric oven and undergoes the following heat treatment, in air:
  rise to 1180° C. at a speed equal to 500° C./h,
  maintenance at 1180° C. for 72 hours,
  lowering to 785° C. at a speed equal to 500° C./h,
  lowering to 640° C. at a speed equal to 20° C./h
  maintenance at 640° C. for 5 hours,
  lowering to ambient temperature at a speed equal to 8° C./h.

The ratio of the area of the bubbles generated during the test and of the area of glass observed taken into account may be evaluated via the following nonlimiting method.

After cooling, the resin is poured into the crucible so as to totally fill the crucible. The crucible is then cut so as to obtain a slice with a thickness equal to 7 mm, said slice containing the vertical axis of symmetry of the crucible and having a height equal to that of the crucible.

The slice is then polished so as to make the glass transparent and to facilitate the observations, said polishing being performed at the minimum with a 1200 grade paper, preferably with diamond paste.

Images are then taken using a light microscope, a source of light illuminating the glass opposite the observation (back-lighting). This back-lighting reveals the bubbles contained in the glass. The development, notably the aperture, is performed so that all the bubbles contained in the glass slice appear sharp.

The magnification used is the highest possible magnification allowing observation of the entire surface of the glass of the slice, in a single image.

The image is then analyzed using the imageJ software available on the website http://rsbweb.nih.gov/ij/ according to the following method:
  open the image in imageJ;
  delete any previous results via the "Analyse>Clear Results" function;
  define the magnitude to be measured, in other words the area, by checking only the "Area" box in "Analyze>Set measurements", and then by confirming with "OK";
  adjust the brightness via the "Image>Adjust>Brightness/contrast" function, then click on "Auto";
  apply a "Gaussian blur" with a sigma (or radius) of a value equal to 2.00 using the "Process>Filters>Gaussian blur" function, then validate by means of the "OK" button;
  convert the number of levels of colors/gray into 8 bits via the "Image>Type>8-bit" function;
  binarize the image via the "Image>Adjust>Threshold>Auto" function, with the "Dark Background" box checked, the scroll menu corresponding to the type of threshold being on "Default", the red threshold color being selected by means of the scroll menu on "Red", do not check "Stack histogram", and click on "Apply" and then close the window;
  using the "Freehand" tool selected by means of the dedicated icon, define by means of the mouse the zone of glass to be analyzed, this zone not containing bubbles in contact with the inner surfaces of the crucible;
  measure the area of said zone, $Z_A$, with the "Analyse>Measure" tool. The area value is displayed in the "Area" column of a window which opens. Note the value and close the window;
  delete the part of the image which is outside the zone of glass to be analyzed using the "Edit>Clear outside" tool, and then deselect the zone of glass to be analyzed previously selected with the "Edit>Selection>Select None" tool and delete the results with the "Analyse>Clear results" tool;
  select the interior of the zone of glass to be analyzed, the zones not to be taken into account, for instance the cracks which may appear during the cooling of the glass. These selections are made using the "Freehand" tool and its dedicated icon;
  determine the area $Z_i$ of each of the zones i not to be taken into account, successively, by means of the following sequence of commands: "Analyse>Measure" and then "Analyse>Clear results" and then "Edit>Clear" and then "Edit>Selection>Select None". Repeat this sequence i times. $Z_B$ is the sum of the areas $Z_i$;

invert the black and white zones of the image using the "Process>Binary>Make Binary" tool. The bubbles then appear black on a white background (value 255 for white, 0 for black);

certain bubbles may appear in the form of empty circles (white circles with a black central part). For these bubbles, transform the black color of the central part to white using the "Process>Binary>Fill holes" function;

determine the area of the bubbles by means of the following commands: "Analyze>Analyze Particles . . . " indicating in the "Size" zone: "0-infinity", in the "Circularity" zone: "0.00-1.00", in the "Show" zone: "Nothing", and then check only the boxes: "Display results", "Clear results", "In situ Show" and click "OK";

save the results file "Results.xls" with the "File>Save As . . . " command;

open the results file "Results.xls" and obtain the sum $Z_c$ of the figures in the "Area" column representing the area of each bubble of the analyzed zone;

calculate the area of glass observed taken into account, equal to the area of glass observed $Z_A$ minus the area $Z_B$ of the excluded zones, $Z_A-Z_B$;

calculate the ratio of the area of the bubbles $Z_c$, and of the area of glass taken into account $Z_A-Z_B$, $Z_C/(Z_A-Z_B)$.

This ratio characterizes the bubbling behavior of the sintered concrete in contact with molten glass used in the test.

Figure 2:

FIGS. 1 and 2 show the areas of glass observed in example 1 outside the invention and example 3 according to the invention, respectively. The bubbles generated by contact of the sintered concrete with the molten glass appear white.

Table 2 below summarizes the features obtained after sintering.

equal to 7.1% and 9.4%, respectively, which is very much smaller than the ratio of the area of bubbles and of the area of glass observed taken into account for the concrete of example 1 outside the invention, equal to 27.9%.

This is likewise the case for the concretes of examples 5, 6, 7, 8, 9, 10 and 11 according to the invention, which have a ratio of the area of bubbles and of the area of glass observed taken into account equal to 8.7%, 7.6%, 9.5%, 8.3%, 11.8%, 12.1% and 8.1%, respectively, which are very much smaller than the ratio of the area of bubbles and of the area of glass observed taken into account for the concrete of example 1 outside the invention, equal to 27.9%.

The amount of defects generated in the glass articles manufactured using the sintered concretes according to the invention is thus smaller than that for glass articles manufactured using the sintered concrete of example 1. The manufacturing yield for the glass articles is thus increased.

The product of example 3 is the product according to the invention that is preferred amongst all.

Needless to say, the present invention is not limited to the described embodiments, which are given as nonlimiting illustrative examples.

In particular, the concretes according to the invention are not limited to particular shapes or sizes.

The invention claimed is:

1. A sintered concrete having the following chemical composition, as mass percentages on the basis of the oxides and for a total of 100%:
   $ZrO_2$: 55 to 70%,
   $SiO_2$: 25 to 40%,
   $P_2O_5$: 0.2 to 9.0%,
   $Al_2O_3$: 0.5 to 7.0%,
   CaO: >0.2%,
   $CaO+MgO+B_2O_3+Fe_2O_3$: 0.2 to 10.0%,
   $MgO+B_2O_3+Fe_2O_3$: ≤7.5%,

TABLE 2

|  | Example 1 | Example 3 | Example 4 | Example 5 | Example 6 | Example 7 | Example 8 | Example 9 | Example 10 | Example 11 |
|---|---|---|---|---|---|---|---|---|---|---|
| $ZrO_2$ (%) | 65.2 | 64.0 | 63.3 | 64.9 | 62.3 | 61.2 | 59.8 | 62.1 | 62.1 | 62.1 |
| $SiO_2$ (%) | 29.6 | 29.0 | 28.7 | 29.4 | 28.3 | 27.8 | 27.1 | 28.2 | 28.2 | 28.2 |
| CaO (%) | 0.71 | 0.69 | 0.69 | 0.71 | 0.68 | 0.67 | 0.65 | 0.68 | 0.68 | 2.78 |
| $Al_2O_3$ (%) | 3.66 | 3.56 | 3.55 | 3.64 | 3.5 | 3.44 | 3.36 | 3.49 | 3.49 | 3.49 |
| MgO (%) | 0.05 | 0.52 | 0.77 | 0.17 | 1.17 | 1.57 | 2.11 | 0.05 | 0.05 | 0.05 |
| $P_2O_5$ (%) | 0.08 | 1.51 | 2.26 | 0.45 | 3.45 | 4.64 | 6.27 | 2.31 | 3.27 | 2.74 |
| $Fe_2O_3$ (%) |  |  |  |  |  |  |  | 2.52 | 0 | 0 |
| $B_2O_3$ (%) |  |  |  |  |  |  |  | 0 | 1.57 | 0 |
| Other oxides (%) | 0.70[1] | 0.72[1] | 0.73[1] | 0.73[1] | 0.6[1] | 0.69[1] | 0.71[1] | 0.66[2] | 0.66[2] | 0.66[2] |
| % of zircon, as a mass percentage on the basis of the mass of the crystalline phases | 87 | 97 | 98 | 93 | 98 | 98 | 98 | 97 | 97 | 97 |
| Apparent density (g/cm³) | 3.73 | 3.65 | 3.64 | 3.67 | 3.58 | 3.58 | 3.56 | 3.66 | 3.58 | 3.67 |
| Apparent porosity (%) | 16.5 | 17.9 | 17.5 | 18.4 | 18.1 | 16.4 | 4.5 | 19 | 19.1 | 17.4 |
| Area of bubbles/area of glass observed taken into account (%) | 27.9 | 7.1 | 9.4 | 8.7 | 7.6 | 9.5 | 8.3 | 11.8 | 12.1 | 8.1 |

[1] oxides other than $ZrO_2$, $SiO_2$, MgO, CaO, $Al_2O_3$ and $P_2O_5$
[2] oxides other than $ZrO_2$, $SiO_2$, MgO, CaO, $Al_2O_3$, $P_2O_5$, $Fe_2O_3$ and $B_2O_3$.

As seen in the results indicated in table 2, after contact at 1180° C. for 72 hours with clear borosilicate glass, the ratio of the area of bubbles and of the area of glass observed taken into account, expressed as a percentage, is smaller for the concretes of examples 3 to 11 according to the invention than for that of the concrete of example 1 outside the invention.

Table 2 shows, in effect, that the concretes of examples 3 and 4 according to the invention have a ratio of the area of bubbles and of the area of glass observed taken into account $B_2O_3+MgO$: ≤4.5%, $ZrO_2+SiO_2+P_2O_5+Al_2O_3+CaO+MgO+B_2O_3+Fe_2O_3$: ≥95.0%, said sintered concrete having crystalline phases and containing more than 70% of zircon, as a mass percentage on the basis of the mass of the crystalline phases, the oxides representing more than 98.5% of the mass of the sintered concrete.

2. The sintered concrete as claimed in claim 1, said composition being such that:

the content of $ZrO_2$ is greater than 57% and less than 67%; and/or the content of $SiO_2$ is greater than 26% and less than 37%; and/or the content of $P_2O_5$ is greater than 0.3% and less than 8.5%; and/or the sum of the contents of CaO, MgO, $B_2O_3$ and $Fe_2O_3$ is greater than 0.3% and less than 9.5%; and/or the content of CaO is greater than 0.3% and less than 7.9%; and/or the sum of the contents of MgO, $B_2O_3$ and $Fe_2O_3$ is less than 7.0%; and/or the sum of the contents of MgO and $B_2O_3$ is less than 4%; and/or the sum of the contents of oxides other than $ZrO_2$, $SiO_2$, $P_2O_5$, $Al_2O_3$, CaO, MgO, $B_2O_3$ and $Fe_2O_3$ is less than 4.5%.

3. The sintered concrete as claimed in claim 1, said composition being such that:

the content of $ZrO_2$ is greater than 58% and less than 65%; and/or the content of $SiO_2$ is greater than 27% and less than 35%; and/or the content of $P_2O_5$ is greater than 0.7% and less than 5.0%; and/or the sum of the contents of CaO, MgO, $B_2O_3$ and $Fe_2O_3$ is greater than 0.5% and less than 5.9%; and/or the content of CaO is greater than 0.4% and less than 5.0%; and/or the sum of the contents of MgO, $B_2O_3$ and $Fe_2O_3$ is less than 3.5%; and/or the sum of the contents of MgO and $B_2O_3$ is less than 2.4%; and/or the sum of the contents of oxides other than $ZrO_2$, $SiO_2$, $P_2O_5$, $Al_2O_3$, CaO, MgO, $B_2O_3$ and $Fe_2O_3$ is less than 3.0%.

4. The sintered concrete as claimed in claim 1, in which the content of zircon, as a mass percentage on the basis of the crystalline phases, is greater than 80%.

5. The sintered concrete as claimed in claim 1, which is in the form of a block, all the dimensions of which are greater than 1 mm.

6. The sintered concrete as claimed in claim 1, having the following chemical composition, as mass percentages on the basis of the oxides and for a total of 100%:
$ZrO_2$: 55 to 70%,
$SiO_2$: 25 to 40%,
CaO: 0.2 to 3.0%,
$Al_2O_3$: 0.5 to 7.0%,
MgO: 0.1 to 3.0%,
$P_2O_5$: 0.3 to 9.0%,
other oxides: <5.0%.

7. The sintered concrete as claimed in claim 6, said composition being such that:
$ZrO_2$>59%, and/or
$SiO_2$>27%, and/or
CaO>0.4%, and/or
$Al_2O_3$>1.0%, and/or
MgO>0.3%, and/or
$P_2O_5$>0.7%.

8. The sintered concrete as claimed in claim 7, said composition being such that:
$ZrO_2$>61%, and/or
$SiO_2$>29%, and/or
CaO>0.5%, and/or
$Al_2O_3$>1.5%, and/or
MgO>0.4%, and/or
$P_2O_5$>1.2%.

9. The sintered concrete as claimed in claim 1, said composition being such that:
$ZrO_2$<67%, and/or
$SiO_2$<35%, and/or
CaO<2.0%, and/or
$Al_2O_3$<6.0%, and/or
MgO<2.1%, and/or
$P_2O_5$<5.0%, and/or
other oxides <3.5%.

10. The sintered concrete as claimed in claim 9, said composition being such that:
$ZrO_2$<65%, and/or
$SiO_2$<31%, and/or
CaO<1.2%, and/or
$Al_2O_3$<4.0%, and/or
MgO<0.9%, and/or
$P_2O_5$<3.0%, and/or
other oxides <2%.

11. The sintered concrete as claimed in claim 1, in which:
the content of $P_2O_5$ is greater than 0.3% and less than 5.8%, and
the content of $Fe_2O_3$ is greater than 0.1% and less than 6.5%, and
the content of MgO is less than 0.5%, and
the content of $B_2O_3$ is less than 0.5%, and
the content of CaO is greater than 0.3% and less than 3%, and
the sum of the contents of MgO and $B_2O_3$ is less than 1%, and
the sum of the contents of CaO, MgO, $B_2O_3$ and $Fe_2O_3$ is greater than 0.3% and less than 10%, and
the sum of the contents of MgO, $B_2O_3$ and $Fe_2O_3$ is greater than 0.1% and less than 7.0%.

12. The sintered concrete as claimed in claim 11, in which:
the content of $P_2O_5$ is greater than 0.5% and less than 3.0%, and/or
the content of $Fe_2O_3$ is greater than 0.5% and less than 3.5%, and/or
the content of MgO is less than 0.3%, and/or
the content of $B_2O_3$ is less than 0.3%, and/or
the content of CaO is greater than 0.4% and less than 2.0%, and/or
the sum of the contents of MgO and $B_2O_3$ is less than 0.6%, and/or
the sum of the contents of CaO, MgO, $B_2O_3$ and $Fe_2O_3$ is greater than 0.7% and less than 5.1%, and/or
the sum of the contents of MgO, $B_2O_3$ and $Fe_2O_3$ is greater than 0.5% and less than 4.4%.

13. The sintered concrete as claimed in claim 1, in which:
the content of $P_2O_5$ is greater than 0.25% and less than 8.3%, and
the content of $B_2O_3$ is greater than 0.05% and less than 4.0%, and
the content of MgO is less than 0.5%, and
the content of $Fe_2O_3$ is less than 0.5%, and
the content of CaO is greater than 0.3% and less than 3%, and
the sum of the contents of CaO, MgO, $B_2O_3$ and $Fe_2O_3$ is greater than 0.3% and less than 8.0%, and
the sum of the contents of MgO, $B_2O_3$ and $Fe_2O_3$ is greater than 0.05% and less than 5.0%, and
the sum of the contents of MgO and $B_2O_3$ is greater than 0.05% and less than 4.5%.

14. The sintered concrete as claimed in claim 13, in which:
the content of $P_2O_5$ is greater than 0.7% and less than 4.5%, and/or
the content of $B_2O_3$ is greater than 0.2% and less than 2.0%, and/or
the content of MgO is less than 0.3%, and/or
the content of $Fe_2O_3$ is less than 0.3%, and/or
the content of CaO is greater than 0.4% and less than 1.5%, and/or
the sum of the contents of CaO, MgO, $B_2O_3$ and $Fe_2O_3$ is greater than 0.5% and less than 4.2%, and/or
the sum of the contents of MgO, $B_2O_3$ and $Fe_2O_3$ is greater than 0.2% and less than 3.0%, and/or
the sum of the contents of MgO and $B_2O_3$ is greater than 0.2% and less than 3.0%.

15. The sintered concrete as claimed in claim 1, in which:
the content of $P_2O_5$ is greater than 0.25% and less than 7.0%, and
the content of CaO is greater than 0.3% and less than 8.4%, and
the content of $B_2O_3$ is less than 0.5%, and
the content of MgO is less than 0.5%, and
the content of $Fe_2O_3$ is less than 0.5%, and
the sum of the contents of CaO, MgO, $B_2O_3$ and $Fe_2O_3$ is greater than 0.3% and less than 9.5%, and
the sum of the contents of MgO, $B_2O_3$ and $Fe_2O_3$ is less than 1.5%, and
the sum of the contents of MgO and $B_2O_3$ is less than 1.0%.

16. The sintered concrete as claimed in claim 15, in which:
the content of $P_2O_5$ is greater than 0.4% and less than 3.5%, and/or
the content of CaO is greater than 0.8% and less than 5.0%, and/or
the content of $B_2O_3$ is less than 0.3%, and/or
the content of MgO is less than 0.3%, and/or
the content of $Fe_2O_3$ is less than 0.3%, and/or
the sum of the contents of CaO, MgO, $B_2O_3$ and $Fe_2O_3$ is greater than 0.7% and less than 4.5%, and/or
the sum of the contents of MgO, $B_2O_3$ and $Fe_2O_3$ is less than 0.5%, and/or
the sum of the contents of MgO and $B_2O_3$ is less than 0.5%.

17. The sintered concrete as claimed in claim 1, in which:
the content of $P_2O_5$ is greater than 0.25% and less than 6.5%, and
the content of $Al_2O_3$ is greater than 0.8% and less than 6.5%, and
the content of $B_2O_3$ is less than 0.5%, and
the content of MgO is less than 0.5%, and
the content of $Fe_2O_3$ is less than 0.5%, and
the content of CaO is greater than 0.3% and less than 3%, and
the sum of the contents of CaO, MgO, $B_2O_3$ and $Fe_2O_3$ is greater than 0.2% and less than 4.5%, and
the sum of the contents of MgO, $B_2O_3$ and $Fe_2O_3$ is less than 1.5%, and
the sum of the contents of MgO and $B_2O_3$ is less than 1.0%.

18. The sintered concrete as claimed in claim 17, in which:
the content of $P_2O_5$ is greater than 0.6, and/or
the content of $Al_2O_3$ is greater than 1.5% and less than 6.0%, and/or
the content of $B_2O_3$ is less than 0.3%, and/or the content of MgO is less than 0.3%, and/or
the content of $Fe_2O_3$ is less than 0.3%, and/or
the content of CaO is greater than 0.4% and less than 2.0%, and/or
the sum of the contents of CaO, MgO, $B_2O_3$ and $Fe_2O_3$ is greater than 0.3% and less than 3.0%, and/or
the sum of the contents of MgO, $B_2O_3$ and $Fe_2O_3$ is less than 1.0%, and/or
the sum of the contents of MgO and $B_2O_3$ is less than 0.5%.

19. A process for manufacturing a sintered concrete, said process comprising the following successive steps:
a) mixing particulate starting materials to form a feedstock,
b) activating said feedstock so as to obtain a fresh concrete,
c) forming said fresh concrete,
d) hardening said fresh concrete so as to obtain a hardened concrete,
e) sintering said hardened concrete so as to obtain said sintered concrete, the feedstock being adapted so that said sintered concrete is in accordance with claim 1.

20. The process as claimed in claim 19, in which the feedstock includes
between 1.0% and 6.0% by weight of a hydraulic binder, and
more than 0.25% of a phosphate chosen from magnesium phosphates, iron phosphates, boron phosphates, calcium phosphates, aluminum phosphates and mixtures thereof, said phosphate providing more than 50% of the phosphorus of the feedstock.

21. The process as claimed in claim 19, in which the feedstock is such that, as mass percentages on the basis of the feedstock,
the mass amount of zircon particles is greater than 75% and less than 95%, and/or
the mass amount of free zirconia particles is greater than 1.0% and less than 20.0%, and/or
the mass amount of hydraulic binder in the feedstock is greater than 1.5% and less than 5.0%, and/or
the mass amount of said phosphate is greater than 0.3% and less than 14.0%.

22. The process as claimed in claim 21, in which the feedstock is such that, as mass percentages on the basis of the feedstock,
the mass amount of zircon particles is less than 90%, and/or
the mass amount of free zirconia particles is greater than 5.0% and less than 15.0%, and/or
the mass amount of hydraulic binder in the feedstock is greater than 2.0% and less than 4.0%, and/or
the mass amount of said phosphate is greater than 1.0% and less than 5.0%.

23. The process as claimed in claim 20, in which the hydraulic binder is a cement.

24. The process as claimed in claim 23, in which the cement is an aluminous cement.

25. The process as claimed in claim 20, in which the alumina content of the hydraulic binder is between 50% and 85%.

26. The process as claimed in claim 20, in which the only phosphate present in the feedstock is $Mg(PO_3)_2 \cdot nH_2O$ or $FePO_4 \cdot nH_2O$ or $BPO_4 \cdot nH_2O$ or $Ca_2P_2O_7 \cdot nH_2O$ or $AlPO_4 \cdot nH_2O$, with $n \geq 0$.

27. A glass production unit, including a component made of a sintered concrete as claimed in any one of claims 1 to 18.

28. A glass production unit including a component made of a sintered concrete as claimed in claim 1, said component being selected from the group consisting of:
  a plate block,
  a floor slab,
  a superstructure component,
  a channel block of a feed channel,
  a burner unit,
  an expandable,
  a mandrel used in the manufacture of glass tubes according to the Danner process, and
  an electrode holder block.

29. The glass production unit as claimed in claim 28, in which the expendable is a tube, a plunger, a stirrer, a rotor, an orifice ring, a spout.

30. The process as claimed in claim 21, in which said phosphate is $Mg(PO_3)_2$.

31. The process as claimed in claim 22, in which said phosphate is $Mg(PO_3)_2$.

* * * * *